United States Patent
Oh

(10) Patent No.: US 6,631,342 B1
(45) Date of Patent: Oct. 7, 2003

(54) APPARATUS FOR AUTOMATICALLY CONTROLLING DIRECTIONAL EARTH MAGNETIC FIELD AND METHOD THEREOF

(75) Inventor: Se Hoon Oh, Gumi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/473,145

(22) Filed: Dec. 28, 1999

(30) Foreign Application Priority Data

Mar. 18, 1999 (KR) .......................................... 1999-9140

(51) Int. Cl.[7] .......................... G01C 17/00; G01C 19/00
(52) U.S. Cl. ..................................................... 702/150
(58) Field of Search .............................. 702/150, 38, 2, 702/14, 115; 324/228, 244, 260, 202; 73/1.75, 1.76; 33/355 R

(56) References Cited

U.S. PATENT DOCUMENTS

| | | | | |
|---|---|---|---|---|
| 3,902,252 A | * | 9/1975 | Farber ........................ 33/361 |
| 4,470,119 A | * | 9/1984 | Hasebe et al. .............. 701/208 |
| 4,686,772 A | * | 8/1987 | Sobel ......................... 33/333 |
| 5,187,872 A | * | 2/1993 | Dufour ....................... 33/356 |
| 5,376,245 A | * | 12/1994 | McLeod .................... 204/155 |
| 5,390,122 A | * | 2/1995 | Michaels et al. ........... 701/200 |
| 5,525,901 A | * | 6/1996 | Clymer et al. ........... 324/207.21 |
| 5,694,037 A | * | 12/1997 | Palstra et al. ............... 324/202 |
| 5,874,848 A | * | 2/1999 | Drafts et al. ................ 327/511 |
| 6,047,237 A | * | 4/2000 | Michmerhuizen ........... 701/224 |
| 6,184,693 B1 | * | 2/2001 | Arai et al. ................... 324/613 |
| 6,242,907 B1 | * | 6/2001 | Clymer et al. ........... 324/207.17 |

FOREIGN PATENT DOCUMENTS

| | | |
|---|---|---|
| CN | 1162140 A | 10/1997 |
| RU | 0693281 A | 11/1979 |
| WO | WO97/09024 | 3/1997 |
| WO | WO98/32278 | 7/1998 |

\* cited by examiner

*Primary Examiner*—John Barlow
*Assistant Examiner*—Demetrius Pretlow
(74) *Attorney, Agent, or Firm*—Fleshner & Kim, LLP

(57) ABSTRACT

An apparatus for automatically controlling directional earth magnetic field which is capable of automatically setting and modifying an strength and a direction of an earth magnetic field, including a power supply unit for applying a voltage to a coil of an earth magnetic field chamber to generate an earth magnetic field; a system controller for variably controlling the voltage applied to the coil of the earth magnetic field chamber from the power supply unit to automatically set an earth magnetic field value; a key input unit for inputting input information or a command, such as selection of an address and earth magnetic field direction, from a user to the system controller; and a screen display unit for displaying an earth magnetic field value set by the system controller.

10 Claims, 6 Drawing Sheets

FIG. 5

- AUTO MEMORY (AUTO MEM)
- ADDRESS MEMORY (ADD MEM)
- INT/EXT
- SELF TEST
- ADDRESS (ADD)

FIG. 7a

| EARTH MAGNETIC FIELD | | | POWER SUPPLY | | | | | |
|---|---|---|---|---|---|---|---|---|
| X | Y | Z=0 | X | | Y | | Z | |
| | | | [V] | [A] | [V] | [A] | [V] | [A] |
| −0.6G | −0.6G | | 0.1V | 0.1A | 0.2mV | 0.2A | | |
| −0.5G | −0.5G | | 0.4V | 0.2A | 0.8mV | 0.4A | | |
| ⋮ | ⋮ | | ⋮ | ⋮ | ⋮ | ⋮ | | |
| +0.5G | +0.5G | | 2V | 1A | 2V | 2A | | |
| +0.6G | +0.6G | | 4V | 2A | 8V | 4A | | |

FIG. 7b

| EARTH MAGNETIC FIELD | | | POWER SUPPLY | | | | | |
|---|---|---|---|---|---|---|---|---|
| X | Y | Z=0 | X | | Y | | Z | |
| | | | [V] | [A] | [V] | [A] | [V] | [A] |
| | −0.6G | −0.6G | | | 0.1mV | 0.1A | 0.2mV | 0.2A |
| | −0.5G | −0.5G | | | 0.4mV | 0.2A | 0.8mV | 0.4A |
| | ⋮ | ⋮ | | | ⋮ | ⋮ | ⋮ | ⋮ |
| | +0.5G | +0.5G | | | 1V | 1A | 2V | 2A |
| | +0.6G | +0.6G | | | 4V | 2A | 8V | 4A |

APPARATUS FOR AUTOMATICALLY CONTROLLING DIRECTIONAL EARTH MAGNETIC FIELD AND METHOD THEREOF

BACKGROUND OF THE INVENTION

1. Field of the Invention

The present invention relates to a technique for controlling an earth magnetic field that has a close relation to a picture quality, and more particularly, to an apparatus for automatically controlling directional earth magnetic field which is capable of automatically setting and modifying an strength and a direction of an earth magnetic field, and to its method.

Especially, after earth magnetic field values are stored in a memory unit of a system controller by using an automatic memory function, when an earth magnetic field value to be set as desired by an operator is inputted, an earth magnetic field data corresponding to the earth magnetic field value inputted from the earth magnetic field data stored in the memory unit is read, and by using this data, an output voltage of a power supply unit of an earth magnetic field chamber is variably adjusted so that a desired earth magnetic field value is automatically set or modified.

2. Description of the Background Art

FIG. 1 is a schematic block diagram of an apparatus for controlling an earth magnetic field in accordance with a conventional art, which includes a gauss meter 11 installed in an earth magnetic field chamber, and power supply units 10A, 10B and 10C connected to the gauss meter 11 for respectively supplying a power of three axes X, Y and Z.

The operation and effect of the apparatus for controlling an earth magnetic field in accordance with the conventional art will now be described.

In the conventional earth magnetic field, the operator identifies a numerical value of the gauss meter 11 and manually adjusts a voltage value of the power supply units 10A, 10B and 10C to set a desired earth magnetic field value.

However, since the strength and the direction of the earth magnetic field values are different in every region of the world, the earth magnetic field values need to be set differently at the stage of fabricating a monitor according to the regions where the monitor is to be sold. Thus, in such a conventional art, the operator sets an earth magnetic field value by manually adjusting a voltage value of the power supply units 10A, 10B and 10C while looking up a gauss meter, which has a problem in that the operation time is taken for a long time for setting and modifying the earth magnetic field value, and thus, its productivity is lowered.

SUMMARY OF THE INVENTION

Therefore, an object of the present invention is to provide an apparatus for automatically controlling a directional earth magnetic field in which a system controller is set to which a gauss meter is connected through a communication interface, and each of earth magnetic field values measure in the gauss meter is transferred from the system controller through the interface and stored in a memory unit of the system controller, thereby providing an automatic memory function, and, when an earth magnetic field value desired to be set by a user is inputted through a key input, the system controller reads an earth magnetic field data corresponding to the earth magnetic field value inputted form the earth magnetic field data stored in the memory unit, and an output voltage of a power supply unit is adjusted by using the earth magnetic field data, thereby automatically setting the earth magnetic field value of an earth magnetic chamber.

To achieve these and other advantages and in accordance with the purposed of the present invention, as embodied and broadly described herein, there is provided an apparatus for controlling a directional earth magnetic field including a power supply unit 10 for applying a voltage to a coil of an earth magnetic field chamber 50 to generate an earth magnetic field; a system controller 20 for variably controlling the voltage applied to the coil of the earth magnetic field chamber 50 from the power supply unit 10 to automatically set an earth magnetic field value; a key input unit 30 for inputting input information or a command, such as selection of an address and earth magnetic field direction, from a user to the system controller 20; and a screen display unit 40 for displaying an earth magnetic field value set by the system controller 20.

In order to attain the above objects, there is provided a method for automatically controlling directional earth magnetic field including the steps of: positioning a gauss meter at the place where an earth magnetic field is desired to be measured and performing an automatic memory function to receive an earth magnetic field value measured by the gauss meter through a communication interface; giving an address to each earth magnetic field value as transferred and storing it in a memory unit; reading a corresponding earth magnetic field data from the memory unit when an operator inputs an earth magnetic value desired to be set; variably controlling an output voltage of a power supply unit by using the earth magnetic field data as read to automatically set a desired earth magnetic field value.

The earth magnetic field value that has a close relation to the picture quality of a monitor is different in its strength and direction in every region of the world. Thus, the earth magnetic field value is to be set suitable to each region so as to adjust a state of the screen of the monitor, when the monitor is fabricated.

Accordingly, due to the different earth magnetic field values according to regions, the earth magnetic field value is to be modified suitably to regional environment when a production model of the monitor is modified, for which an automatic memory function is provided for automatically setting the strength and the direction of the earth magnetic field of an earth magnetic field chamber that generates an earth magnetic field of a specific region in the present invention.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 shows a displayed menu of FIG. 4 in accordance with the present invention;

FIGS. 7A and 7B shows tables of automatic memory as processed in accordance with the present invention.

DETAILED DESCRIPTION OF THE PREFERRED EMBODIMENTS

Reference will now be made in detail to the preferred embodiments of the present invention, examples of which are illustrated in the accompanying drawings.

The operation of an apparatus for controlling a directional earth magnetic field in accordance with the present invention will now be described with reference to FIG. 2.

Figure 1:
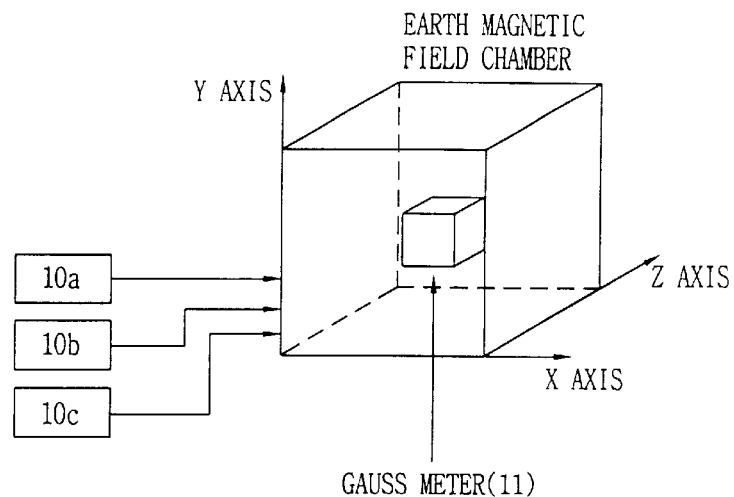
FIG. 1 is a schematic block diagram of an apparatus for controlling an earth magnetic field in accordance with a conventional art.
Figure 2:
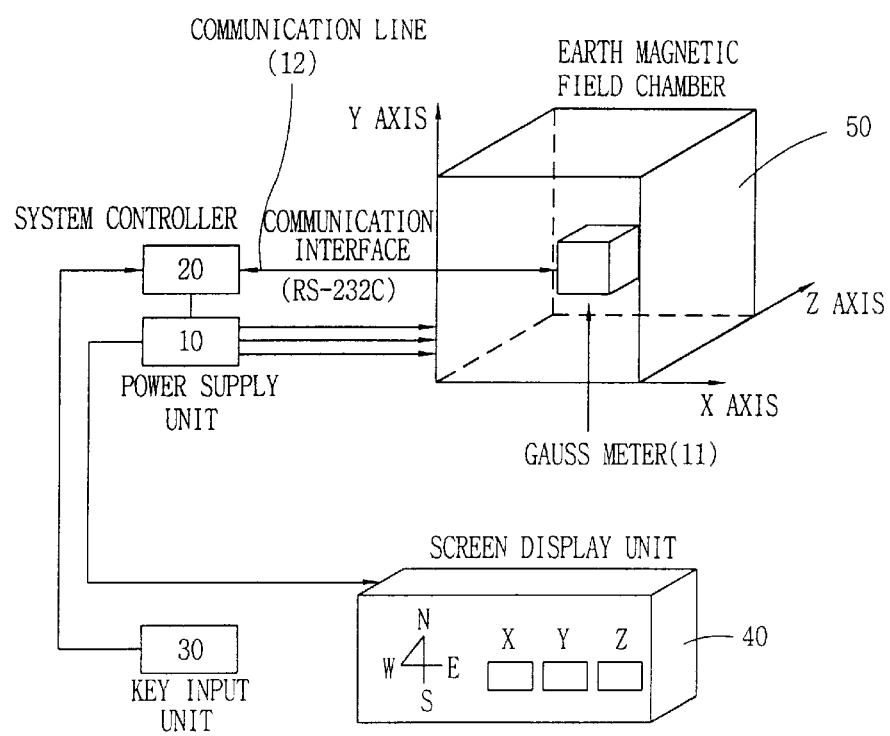
FIG. 2 is a schematic view of an apparatus for controlling a directional earth magnetic field in accordance with the present invention.

FIG. 2 is a schematic view of an apparatus for controlling a directional earth magnetic field in accordance with the present invention.

The power supply unit 10 applies a voltage to a coil of the earth magnetic field chamber 50 to generate an earth magnetic field.

The system controller 20 receives the earth magnetic field value measured by the three-axes gauss meter 11 of the earth magnetic field chamber 50 through the communication interface 12, stores it in the internal memory and variably controls a voltage applied to the coil of the earth magnetic field chamber 50 from the power supply unit 10 to thereby automatically set an earth magnetic field value.

The key input unit 30 inputs an input information or a command of a user such as selection of an address and a direction of the earth magnetic field to the system controller 20.

The screen display unit 40 displays an earth magnetic field value set by the system controller 20.

Figure 3:
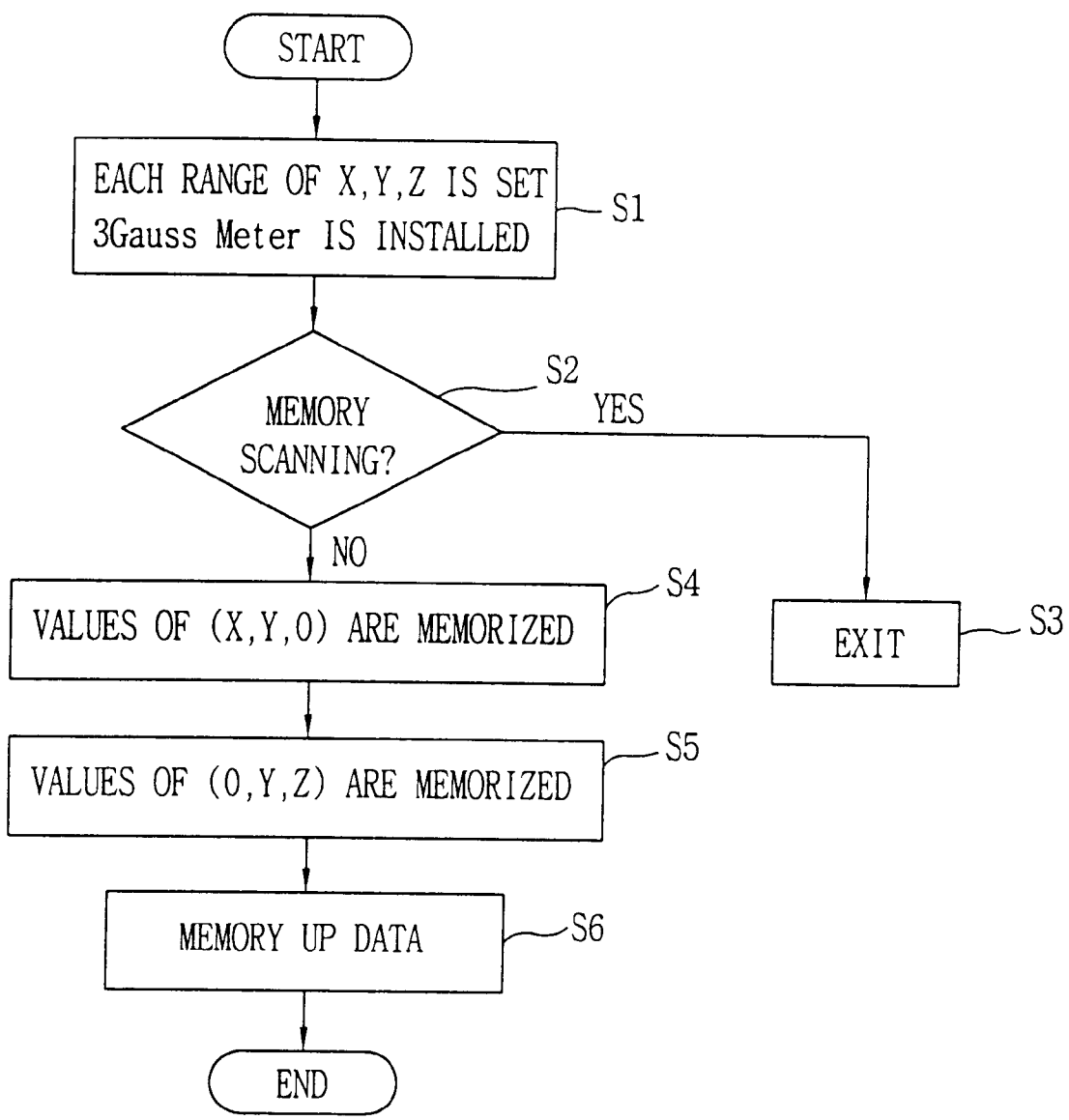
FIG. 3 is a flow chart of an automatic memory process of FIG. 2 in accordance with the present invention.

FIG. 3 is a flow chart of an automatic memory process of FIG. 2 in accordance with the present invention.

First, after X, Y, Z regions are set in the earth magnetic field chamber, the three-axes gauss meter is positioned at a predetermined space desired to be measured in step S1.

Then, the system controller 20 judges whether there is a memory scanning or not in a step S2.

Upon such judgement, if there is no memory scanning, the system controller is taken out of it, while, if there is a memory scanning, the system controller 20 memorizes values of X, Y, 0 in the memory in a step S4, and then memorizes values of 0, Y, Z in a step S5.

Thereafter, the system controller 20 finally updates the memory in a step S6.

In the above processes, as the system controller 20 is connected to the gauss meter 11 by the communication interface 12, when the automatic memory function is performed, the system controller 20 receives the earth magnetic field value measured by the gauss meter 11 through the communication interface and stores it in the memory unit included in its inside in a manner that the earth magnetic field value is read by 0.1 G unit for each axis of the earth magnetic field chamber in the range of −0.6 G~+0.6 G and memory tables of (X,Y,0) and (0,Y,Z) are formed.

In this respect, the reason for forming the two memory tables of (X,Y,0) and (0,Y,Z) in setting the automatic memory function is that if the memory is made by 13 steps on the three axes of (X,Y,Z), 2197 pairs of memory tables are made, which disadvantageously causes a too much long time taken for setting an automatic memory.

Therefore, on the basis that the Z (horizontal direction) earth magnetic field is always '0' and by forming the two memory tables (X,Y,0) and (0,Y,Z) that respectively take X (vertical direction) earth magnetic field and Z (horizontal direction) earth magnetic field for changing the earth magnetic field, the direction of the earth magnetic field is changeable by referring to a corresponding memory table every time when the direction of the earth magnetic field is rotated by 90°, and at the same time, the time taken for automatic memory is reduced.

Thereafter, the system controller 20 stores the earth magnetic field value as transferred by giving an address to the two memory tables.

Figure 4:
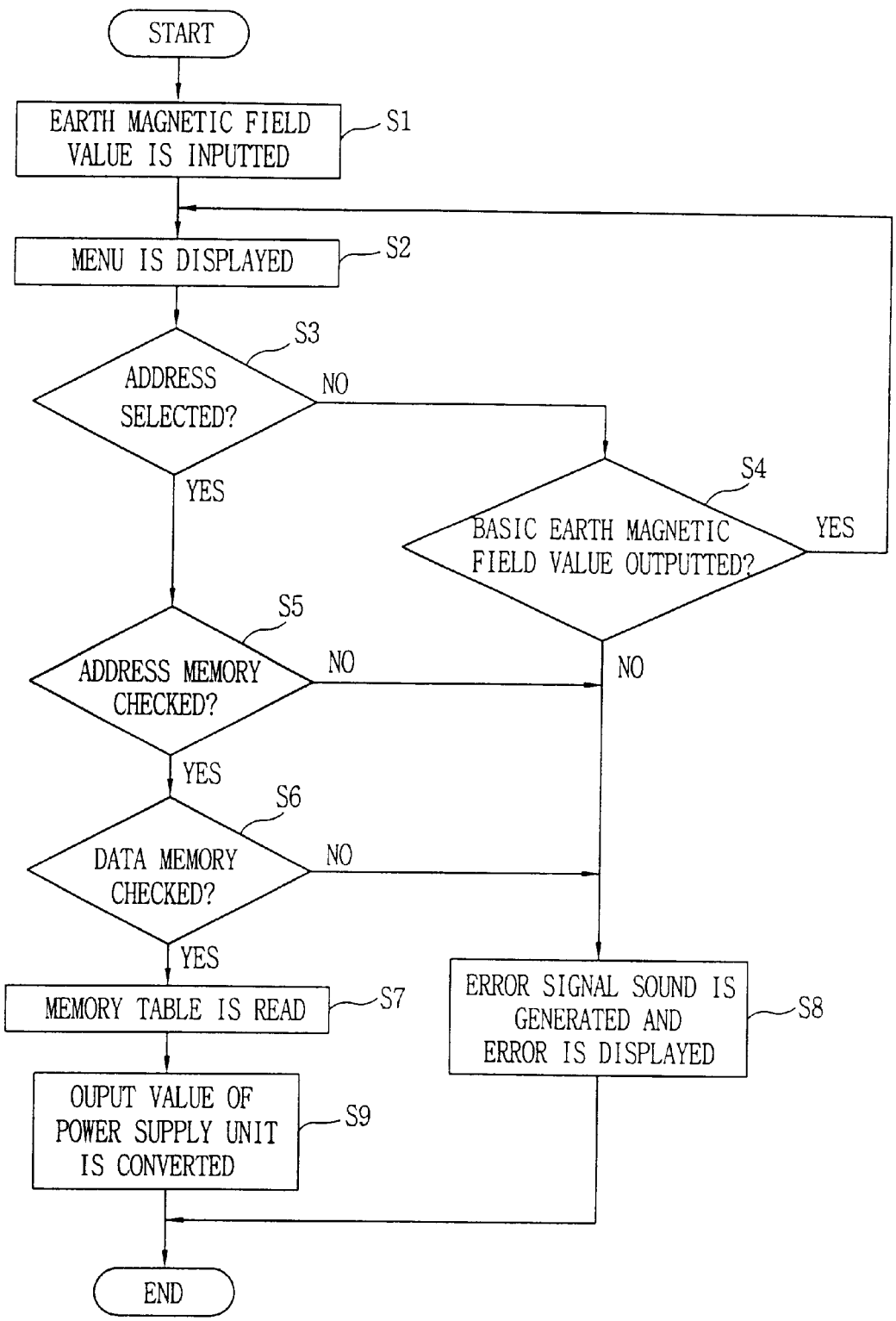
FIG. 4 is a flow chart of a process of automatically controlling a directional earth magnetic field by using an automatic memory function of FIG. 2 in accordance with the present invention.

FIG. 4 is a flow chart of a process of automatically controlling a directional earth magnetic field by using an automatic memory function of FIG. 2 in accordance with the present invention.

First, an earth magnetic field value desired to be set by the operator is inputted through key operation of the key input unit 30 in a step S1.

Then, a menu for selecting an earth magnetic field data is displayed on the screen display unit 40 in a step S2.

The system controller 20 of FIG. 2 judges that an address was selected in a step S3.

If the address was not selected in the step S3, the system controller 20 judges again whether a basic earth magnetic field value was outputted in a step S4.

If the basic earth magnetic field value was outputted, it returns to the step S1, while if the basic earth magnetic field value was not outputted, an error signal sound is generated and an error is displayed in a step S8.

In the step S3, if the address was selected, an address memory is checked to discriminate whether there is an earth magnetic field value corresponding to the address in a step S5.

Upon checking the address memory in the step S5, if there is no corresponding earth magnetic field value data, the step S8 is performed, while if there is a corresponding earth magnetic field value data, the data memory is re-checked to discriminate whether there is a power supply adjusting data in the power supply unit 10 in a step S6.

If there is no power supply adjusting data in the step S6, the step S8 is performed, while if there is a power supply adjusting data, a corresponding power supply adjusting data of the memory table is read in a step S7, and an output value of the power supply unit 10 is converted in a step S9.

FIG. 5 shows a displayed menu of FIG. 4 in accordance with the present invention.

'Auto Memory (AUTO MEM)' is one for the earth magnetic field automatic memory processing shown in FIG. 3 according to the selection of the operator. 'Address Memory (ADD MEM)' is one for inputting the earth magnetic field value desired to be displayed by the operator on the axes of (X,Y,Z). 'INT/EXT' is one for determining whether the system is operated by INT(Key board) or by EXT(Key box). 'SELF TEST' is for self-testing a hard ware part of the system. 'Address(ADD)' is for selecting the address in the step S3.

Figure 6:
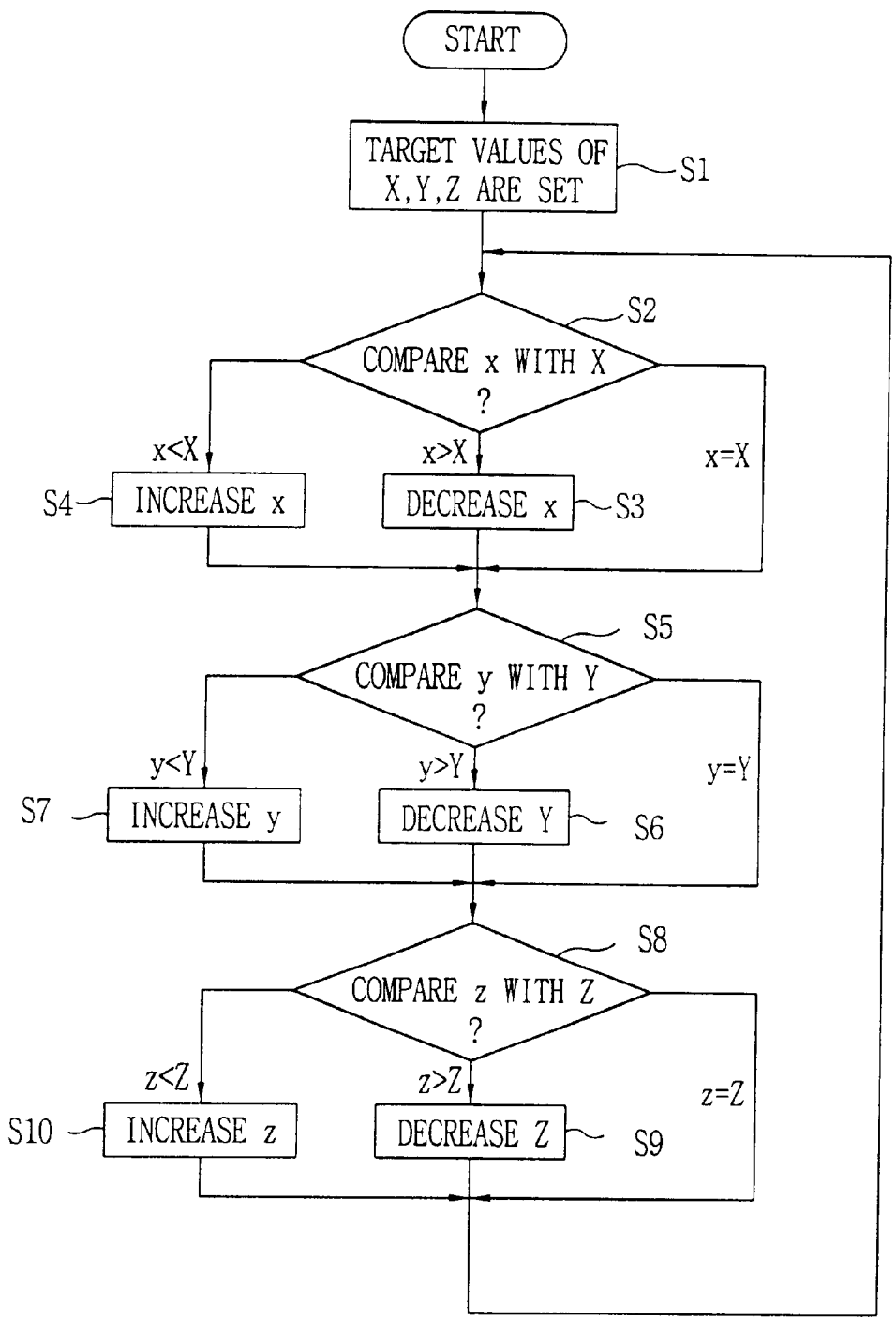
FIG. 6 is a flow chart of a process of performing a memory at three axes of X, Y and Z of FIG. 3 in accordance with the present invention.

FIG. 6 is a flow chart of a process of performing a memory at three axes of X, Y and Z of FIG. 3 in accordance with the present invention.

First, values of X1, Y1 and Z1, that is, target values of the three-axes earth magnetic field, are set in a step S1.

The target value X1 is compared to a gauss value x outputted from the X axis of the current power supply unit in a step S2.

If the value x is greater than the value X1, the value x is reduced in a step S3, while if the value x is smaller than the value X1, the x value is increased in a step S4.

In case that the value x is the same as the value X1, it goes to the next step.

Likewise, the target value Y1 is compared with a gauss value y outputted from the Y axis of the current power supply unit in a step S5.

If the value y is greater than the value Y1, the value y is reduced in a step S6, while, if the value y is smaller than the value Y1, the value y is increased in a step S7.

In case that the value y is the same as the value Y1, it goes to the next step.

In the same manner, the target value Z1 is compared with a gauss value z outputted from the Z axis of the current power supply unit in a step S8.

If the value z is greater than the value Z1, the value z is reduced in a step S9, while, if the value z is smaller than the value Z1, the value z is increased in a step S10.

In case that the value z is the same as the value Z1, it goes to the step S2.

FIGS. 7A and 7B shows tables of automatic memory as processed in accordance with the present invention.

FIG. 7A shows voltage and current output values of the power supply units of each axis after automatically memorizing each earth magnetic field value of X and Y axes by taking Z axis is '0', and FIG. 7B shows voltage and current output values of the power supply units of each axis after automatically memorizing each earth magnetic field value of Y and Z axes by taking X axis is '0'. In this respect, the range of the earth magnetic field value of each axis is −0.6 G~+0.6 G, and the maximum voltage value of the power supply unit is 50V and the maximum current value is 5A.

For a detailed explanation, the operator may input an earth magnetic field value desired to be set by operating the key of the key input unit 30, or may select an address of a desired earth magnetic field data among the menu displayed on the screen, according to which the system controller 20 reads the earth magnetic field value data corresponding to the selected address, thereby controlling the output voltage of the power supply unit 10 by using the earth magnetic field data.

Under the control of the system controller 20, the power supply unit 10 applies a voltage of a predetermined level to the coil of the earth magnetic field chamber, so that the earth magnetic field value desired by the operator is automatically set.

Here, the operator simply operates an UP/DOWN key or a SHIFT key provided in the key input unit 30, so that he or she adjusts earth magnetic field value or the direction of the earth magnetic field displayed on the screen display unit 40 in every direction minutely to thereby easily consider how the earth magnetic field value and the direction change of the earth magnetic field affect the picture quality of the monitor.

At the same time, the screen display unit 40 displays the earth magnetic field value as set under the control of the system controller on the screen.

The screen display unit 40 is made of a bifacial panel to display the set earth magnetic field value on both sides thereof, so that the operator part can easily identify whether the earth magnetic field value was changed, and thus, a modification of the earth magnetic field value due to inadvertence of the operator can be prevented.

Meanwhile, in a state that a menu for selecting an earth magnetic field data is displayed on the screen display unit 40, in case that an address of the earth magnetic field value desired to be set by the user is not inputted or if the earth magnetic field data selected by the user does not exist, the system controller 20 generates a warning sound and displays an error message on the screen display unit 40.

At this time, the user sets an earth magnetic field value and an earth magnetic field direction by operating the key.

That is, when the user inputs an earth magnetic field value desired to be set by key inputting, the system controller 20 reads an earth magnetic field data corresponding to the inputted earth magnetic field value form the memory unit and controls a voltage outputted from the power supply unit 10 by using the earth magnetic field data, thereby setting an earth magnetic field value as desired by the user.

As so far described, in the apparatus and method for automatically controlling directional earth magnetic field of the present invention, after earth magnetic field values are stored in the memory unit of a system controller by using the automatic memory function, when the earth magnetic field value to be set as desired by an operator is inputted, the earth magnetic field data corresponding to the earth magnetic field value inputted from the earth magnetic field data stored in the memory unit is read, and by using this data, the output voltage of the power supply unit of the earth magnetic field chamber is adjusted so as to be automatically set or modified to the desired earth magnetic field value.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An apparatus for controlling a directional earth magnetic field, comprising:

a power supply unit for applying a voltage to a coil of an earth magnetic field chamber to generate an earth magnetic field;

a system controller for variably controlling the voltage applied to the coil of the earth magnetic field chamber from the power supply unit to automatically set an earth magnetic field value;

a key input unit for inputting input information or a command including a selection of an address and earth magnetic field direction, from a user to the system controller; and a communication interface for connecting a gauss meter measuring the earth magnetic field value and the system controller.

2. The apparatus according to claim 1, wherein the key input unit refers to a remote controller that is capable of controlling each function of the system controller from a long distance.

3. An apparatus for controlling a directional earth magnetic field, comprising:

a power supply unit for applying a voltage to a coil of an earth magnetic field chamber to generate an earth magnetic field;

a system controller for variably controlling the voltage applied to the coil of the earth magnetic field chamber from the power supply unit to automatically set an earth magnetic field value;

a key input unit for inputting input information or a command including a selection of an address and earth magnetic field direction, from a user to the system controller;

a screen display unit for displaying an earth magnetic field value set by the system controller; and a communication interface for connecting a gauss meter measuring the earth magnetic field value and the system controller.

4. The apparatus according to claim 3, wherein the key input unit refers to a remote controller that is capable of controlling each function of the system controller from a long distance.

5. The apparatus according to claim 3, wherein the screen display unit is formed to be bifacial.

6. A method for automatically controlling directional earth magnetic field, comprising the steps of:

positioning a gauss meter at the place where an earth magnetic field is desired to be measured and performing an automatic memory function to receive an earth magnetic field value measured by the gauss meter through a communication interface;

giving an address to each earth magnetic field value as transferred and storing it in a memory unit;

reading a corresponding earth magnetic field data from the memory unit when an operator inputs an earth magnetic value desired to be set; and variably controlling an output voltage of a power supply unit by using the earth magnetic field data as read to automatically set a desired earth magnetic field value.

7. The method according to claim 6, wherein performing the automatic memory function includes the steps of:

setting a target value of the earth magnetic field of the three axes of X, Y and Z;

comparing the current earth magnetic field value outputted from the power supply unit on the X axis and the target value of the X axis, and increasing or decreasing the current earth magnetic field value on the X axis;

comparing the current earth magnetic field value outputted from the power supply unit on the Y axis and the target value of the Y axis, and increasing or decreasing the current earth magnetic field value on the Y axis; and comparing the current earth magnetic field value outputted from the power supply unit on the Z axis and the target value of the Z axis, and increasing or decreasing the current earth magnetic field value on the Z axis.

8. A method for automatically controlling directional earth magnetic field, comprising:

first step of inputting an earth magnetic field value desired to be set by an operator through a key operation of the key input unit;

second step of displaying a menu for selecting an earth magnetic field data on a screen display unit;

third step of judging whether an address was selected by a system controller;

fourth step of judging again whether a basic earth magnetic field value was outputted in case that no address was selected in the third step, returning to the first step if the basic earth magnetic field value was outputted, generating an error signal and displaying an error if no basic earth magnetic field was outputted;

fifth step of checking an address memory and discriminating whether there is an earth magnetic field value corresponding to the address if the address was selected in the third step;

sixth step of checking the address memory, and generating an error signal sound and displaying the error if there is no corresponding earth magnetic field value data;

seventh step of checking again the data memory and discriminating whether there is a power adjusting data in the power supply unit if there is a corresponding earth magnetic field value in the fifth step; and eighth step of generating an error signal and displaying an error if there is no power adjusting data in the seventh step, reading a corresponding power adjusting data in the memory table and converting an output value of the power supply unit if there is the power adjusting data.

9. A method for automatically controlling directional earth magnetic field, comprising:

applying a voltage of a power supply unit to a coil of an earth magnetic field chamber to generate an earth magnetic field;

controlling the voltage applied to the coil of the earth magnetic field chamber by a system controller to automatically set an earth magnetic field value;

inputting input information or a command including a selection of an address and earth magnetic field direction, from a user to the system controller through a key input unit; and connecting a gauss meter measuring the earth magnetic field value and the system controller through a communication interface.

10. The method according to claim 9, wherein the key input unit includes a remote controller that is capable of controlling each function of the system controller from a long distance.

* * * * *